United States Patent [19]

Fuhrmann

[11] Patent Number: 4,671,910

[45] Date of Patent: Jun. 9, 1987

[54] PROCESS FOR THE PRODUCTION OF CLOSED-CELL FOAM MOLDED ARTICLES OF CROSSLINKED POLYOLEFIN

[75] Inventor: Horst Fuhrmann, Ochtendung, Fed. Rep. of Germany

[73] Assignee: Dynamit Nobel Aktiengesellschaft, Troisdorf, Fed. Rep. of Germany

[21] Appl. No.: 766,392

[22] Filed: Aug. 16, 1985

[30] Foreign Application Priority Data

Aug. 16, 1984 [DE] Fed. Rep. of Germany ....... 3430108

[51] Int. Cl.$^4$ .......................... C08J 9/06; B29C 67/22
[52] U.S. Cl. ...................................... 264/54; 264/55; 264/DIG. 18
[58] Field of Search ............... 264/DIG. 18, 45.2, 54, 264/55

[56] References Cited

U.S. PATENT DOCUMENTS 3,818,086 6/1974 Stastny et al. ................. 264/45.2 X

FOREIGN PATENT DOCUMENTS 1126857 9/1968 United Kingdom .
1328525 8/1973 United Kingdom .

Primary Examiner—Philip Anderson
Attorney, Agent, or Firm—Antonelli, Terry & Wands

[57] ABSTRACT

Closed-cell foam molded parts or articles of crosslinked polyolefin are manufactured according to a process comprising the steps of filling a foamable and crosslinkable polyolefin composition containing a blowing agent and a crosslinking agent into a closed mold and molding a correspondingly shaped, foamable product under pressure, the crosslinking reaction progressing without decomposition of the blowing agent; subsequent heating of the resultant foamable, crosslinked product to a blowing temperature between a pair of metal plates, wherein the product can expand biaxially within the region left between the metal plates; and then heating of the thus-obtained intermediate product under low pressure of about 1 bar so that it can expand into all directions with complete decomposition of the residual blowing agent to result in the completely foamed molded part.

9 Claims, 7 Drawing Figures

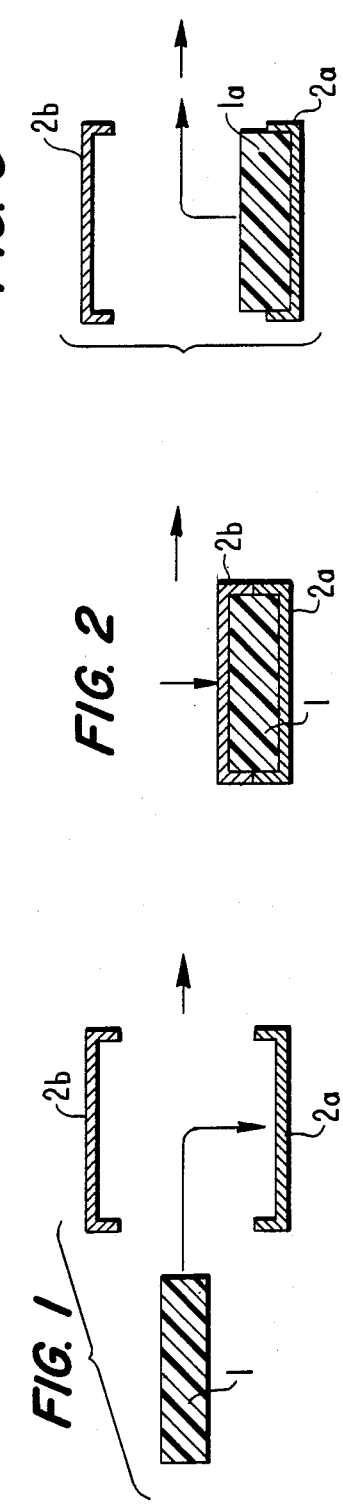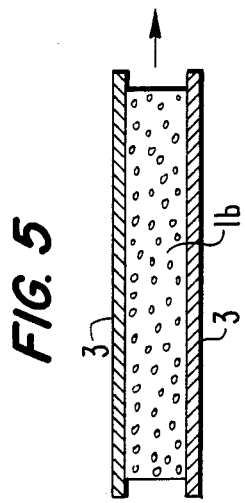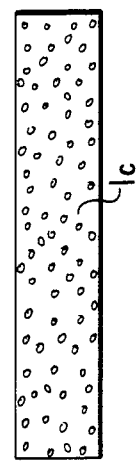

PROCESS FOR THE PRODUCTION OF CLOSED-CELL FOAM MOLDED ARTICLES OF CROSSLINKED POLYOLEFIN

The present invention relates to a process for the production of molded articles or parts having a closed-cell foam structure and being based on crosslinked polyolefins Conventional processes for manufacture of molded parts of foam with closed cells made of cross-linked polyolefins, for example according to DOS No. 1,694,130, operate in such a way that, in the first stage, the crosslinking reaction of the polyolefin of a foamable and crosslinkable polyolefin composition is first achieved by decomposition of an organic peroxide or by use of electron beams and thereafter the blowing agent in the resulting crosslinked polyolefin-containing composition is decomposed, thus producing a foam structure of the crosslinked polyolefin. In this method, no external pressure is applied in the crosslinking stage and in the expansion stage, resulting in relatively coarse-cell foam materials having an irregular surface.

For producing uniform, fine-cell foam materials with closed cells based on crosslinked polyolefins, German Pat. No. 2,038,506 proposes, for example, to expand a foamable and crosslinkable composition containing a polyolefin, a blowing agent and a crosslinking agent in a three-stage process. In this method, in the first stage, the foamable and crosslinkable mixture is heated in a closed mold under elevated pressure until the crosslinking reaction has taken place; thereafter, heating is continued, while maintaining the elevated pressure, to increase the temperature into the lower range of the decomposition temperature of the blowing agent up to an initial, partial decomposition of the blowing agent; then, while maintaining the temperature and lowering the pressure, the mixture is partially expanded in a second phase and thereafter the partially foamed product is subjected to final expansion after heating entirely to the decomposition temperature of the blowing agent under atmospheric pressure with complete decomposition of the blowing agent. This process turned out to have the drawback that the unfinished product, crosslinked and expanded in the closed mold during the first stage, is pressed against the walls of the closed mold and sticks to the walls whereby unmolding, i.e. removal from the mold, is considerably complicated. For this reason, such molds are designed with a trapezoidal unmolding side, the upper side being longer than the lower side to facilitate removal of the pre-expanded unfinished product. However, as a result, the preexpanded unfinished product has a peripheral section of lower thickness which curls in the subsequent stage during foaming and becomes a useless part and consequently must be removed. This, though, causes an additional amount of waste material, rendering the final product more expensive.

It is an object of this invention to provide a process for the production of molded parts of crosslinked polyolefin closed-cell foam, yielding a uniform fine-cellular structure with less required work and improved productivity as compared with the known methods. The process reduces the necessary number of process steps and results in less waste, i.e. a greater yield of usable foam, based on the material employed. Furthermore, it is an object of the invention to improve the process for the production of closed-cell molded parts of crosslinked polyolefins so that molded foam parts having a large thickness and a high degree of expansion can be produced. Additional features and advantages of the invention will be described in the following specification These objects are attained according to the present invention by a process wherein, starting with a foamable and crosslinkable composition containing a polyolefin homopolymer and/or copolymer with a blowing agent and a crosslinking agent, which composition is filled into a closed the mold is closed and, the composition is heated in the closed mold under elevated pressure at a temperature effecting the crosslinking of the polyolefin by decomposition of the crosslinking agent and by occurrence of the crosslinking reaction, but at which the decomposition of the blowing agent does not as yet take place, thus obtaining a foamable, crosslinked product. Thereafter, the foamable, crosslinked product is removed from the closed mold and inserted in between a pair of metal plates and heated to a foaming temperature, to effect partial decomposition of the blowing agent and expansion of the product within the region defined by the metal plates, resulting in a preexpanded intermediate product having a slab-like configuration. Then the pre-expanded intermediate product is heated under low pressure which approximately corresponds to the atmospheric pressurs of 1 bar, to a temperature corresponding at least to the foaming temperature in order to decompose the residual blowing agent within the intermediate product, during which step the intermediate product expands into all directions, thus producing the finished molded foam component.

A molded foam part having a very uniform closed-cell structure is obtained by the proposed process. The process stages according to the invention increase the productivity of the method and facilitate handling. The process of this invention makes it possible to manufacture molded foam parts having an expansion factor of 20 to 50 times the original volume of the foamable and crosslinkable composition utilized.

The polyolefins preferably employed according to this invention are polyethylene of preferably low density, ethylene-vinyl acetate copolymers, with a vinyl acetate portion of 5–20% by weight, poly-1,2-butadiene, ethylene-propylene copolymers, ethylene-butene copolymers, copolymers of ethylene with up to 45% of methyl, ethyl, propyl or butyl acrylate or methacrylate, chlorinated products of these homopolymers or copolymers with a chlorine content of up to 60% by weight, mixtures of two or more of the aforementioned polymers, and mixtures of these polymers with less than 30% isotactic or atactic polypropylene.

The blowing agents preferably utilized according to this invention are chemical blowing agents, the decomposition temperature of which is higher than the melting point of the polyolefins employed. Examples of such chemical blowing agents are, without being limited thereto, azo compounds, such as azodicarbonamide and barium azodicarboxylate, nitroso compounds, such as dinitrosopentamethylenetetramine and trinitrosotrimethyltriamine, hydrazide compounds, such as p,p'-oxybis(benzenesulfonylhydrazide), sulfonylsemicarbazide compounds, such as p,p'-(benzenesulfonylsemicarbazide) and toluenesulfonylsemicarbazide, etc. Among these blowing agents, azodicarbonamide is preferred since it has a high nitrogen content, permits ready adaptation of decomposition rate and temperature, and is commercially available. The blowing agent is usually employed in amounts of 10–25 parts by weight per 100 parts by weight of polyolefin, thus obtaining a finished molded foam part exhibiting an expansion rate of 20 to 50 times the original volume of the foamable and crosslinkable composition. It is possible according to the present invention to vary the decomposition rate and temperature of the blowing agent by adding an auxiliary blowing agent. Examples of such auxiliary blowing agents are, without being limited thereto, compounds containing urea as the main component, metal oxides, such as zinc oxide and lead oxide, compounds containing salicyclic acid, stearic acid, etc., as the main component, i.e. higher fatty acids, metal compounds of higher fatty acids, etc. The auxiliary blowing agent is to be chosen in harmony with the blowing agent.

Crosslinking agents having a lower decomposition temperature than the decomposition temperature of the blowing agent utilized in the polyolefin-containing composition are used for the invention so that, when the composition is heated, first the decomposition of the crosslinking agent can occur (and the accompanying crosslinking reaction) before decomposition of the blowing agent takes place upon further heating. This requirement is met by organic peroxides, decomposing during heating to form free radicals which can effect intermolecular or intramolecular crosslinking and which, therefore, can advantageously serve as radical-forming agents. Also, the decomposition temperature of the crosslinking agent must be lower than that of the blowing agent and/or the mixture of blowing agent and auxiliary foaming agent, so that it can be ensured that the cross-linking reaction can occur in the first stage in the closed mold without a foaming reaction. Examples for such organic peroxides are, without being limited thereto, dicumyl peroxide, 1,1-ditert-butylperoxy-3,3,5-trimethylcyclohexane, 2,5-dimethyl-2,5-di-tert-butyl-peroxyhexane, 2,5-dimethyl-2,5-di-tert-butylperoxyhexyne, α,α-ditert-butylperoxydiisopropylbenzene, tert-butyl-peroxyketone, tert-butylperoxybenzoate, etc. Those peroxides should be selected which are best adapted to the respective type of polyolefin.

The crosslinking agent is preferably used in amounts of 0.3–1.5 parts by weight, preferably between 0.5 and 1.0 part by weight, based on 100 parts by weight of the polyolefin in the composition.

In the accompanying drawings FIGS. 1 through 7 schematically illustrate the sequence of steps in the process of the invention wherein:

FIG. 1 illustrates the step of loading the foamable and crosslinkable composition containing a polyolefin, blowing agent and crosslinking agent into a mold;

FIG. 2 illustrates the crosslinkable and foamable composition within the closed mold during which time the composition is heated to effect crosslinking without substantial decomposition of the blowing agent;

FIG. 3 illustrates the step of removing the removable crosslinked product from the mold;

FIG. 4 illustrates the step of inserting the crosslinked product between a pair of metal plates and heating the product to a foaming temperature;

FIG. 5 illustrates the step of expansion of the crosslinked product biaxially within the region defined by a pair of metal plates;

FIG. 6 illustrates the step of heating the preexpanded intermediate product under atmospheric pressure; and FIG. 7 illustrates the finished and molded foam product which has been expanded in all directions.

It is possible within the scope of the present invention, for improving the properties of the composition and/or of the molded part and for cost reduction, to add, if desired, additives or fillers exhibiting no deleterious effect on the crosslinking of the polyolefin, for example carbon black, metal oxides, such as zinc oxide, titanium oxide, calcium oxide, magnesium oxide, and silicon oxide, carbonates, such as magnesium carbonate and calcium carbonate, fibrous filler materials, such as wood pulps, colorants, pigments, and additives as they can be processed customarily together with elastomers.

The foamable and crosslinkable composition is produced at elevated temperatures of up to about 120° C. by mixing and mechanical processing of the components, for example by means of a suitable and heated mixing roll, plasticizing screw, or the like.

Several advantageous, foamable and crosslinkable compositions according to this invention will be described hereinafter:

Composition A

For foamed molded parts having an expansion rate of 30 times the original volume of the foamable and crosslinkable composition, the following mixture is produced by kneading:
 100 parts by weight of low-density polyethylene;
 14–17 parts by weight of azodicarbonamide;
 0–0.4 part by weight of zinc oxide or activated zinc oxide or 0–0.6 part by weight of zinc stearate; and
 0.5–0.8 part by weight of dicumyl peroxide.

Composition B

For finished foamed molded parts having an expansion rate of 30 times the original volume of the foamable and crosslinkable composition, it is also possible to prepare a mixture of:
 100 parts by weight of ethylene-vinyl acetate copolymer with a vinyl acetate content of 5–20% by weight;
 14–17 parts by weight of azodicarbonamide;
 0–0.4 part by weight of zinc oxide or activated zinc oxide or 0–0.6 part by weight of zinc stearate; and
 0.5–1.0 part by weight of dicumyl peroxide.

Composition C

For finished foamed molded parts with an expansion rate of 40 times the original volume of the foamable and crosslinkable composition, a mixture is prepared from:
 100 parts by weight of low-density polyethylene;
 18–22 parts by weight of azodicarbonamide;
 0–0.3 part by weight of zinc oxide or activated zinc oxide or 0–0.6 part by weight of zinc stearate, and
 0.5–1.0 part by weight of dicumyl peroxide.

Composition D

It is also possible to utilize, for finished foamed molded parts having an expansion rate of 40-fold, a mixture prepared from:
 100 parts by weight of ethylene-vinyl acetate copolymer with a vinyl acetate content of between 5 and 20% by weight;
 18–22 parts by weight of azodicarbonamide;
 0–0.3 part by weight of zinc oxide or activated zinc oxide or 0–0.6 part by weight of zinc steareate; and
 0.5–1.2 parts by weight of dicumyl peroxide.

The crosslinking and foaming process of this invention will be described in greater detail hereinafter. In the first process stage, the composition to be foamed and crosslinked and which can contain the ingredients decribed hereinabove, is prepared, for example by kneading on a mixing roll, and then is filled into a mold having the deeired size. The mold is, for example, made in two halfs and has a determined volume. After filling of the composition into the mold, the mold is closed and pressed, at which the composition completely fills the mold. At this material of the composition being in excess can flow out from the separating line of the two halfs of the mold. On this mold there is applied from abroad, for inst. by aid of a suitable press, for inst. an oil pressure press, a determined pressure of more than 10 bar, preferably 20 to 200 bar. In the following the composition is heated. Such heating is made at temperatures being sufficient to decompose the crosslinking agent. But it is also possible that they are higher than the decomposition temperature of the crosslinking agent, but they muat be lower than the decomposition temperature of the crossexpanding agent so that not yet an essential decomposition of the expanding agent may occur. This temperature range is at up to 160° C., preferably in a range between 135° up to 155° C. The resulting pressure occuring in the mold at the heating of the composition by the temperature conditioned extension is determined by the determined pressure applied from abroad and being in a range of 20 to 200 bar and by which the mold is pressed together.

A treatment period of 20–60 minutes is chosen for adequate crosslinking in the closed mold with the use of pressure and heating in a range of preferably 135°–155° C., this period depending on the size of the mold. Thus, in the first stage, a foamable, crosslinked product is obtained that corresponds in its external shape to the mold configuration. In this first process stage, the gel content of the foamable, crosslinked product is to be, during heating, within the range of 1–70%. If the gel content exceeds 70%, then the foamable, crosslinked product cannot be sufficiently expanded, i.e. blown, in the subsequent stages. However, if the gel content is lower than 1%, then the properties of the finished foamed product, especially the cellular structure, are not adequately tough so that a low-quality product is obtained. With insufficient crosslinking of the composition, it can thus happen that the blowing agent escapes on account of the low viscosity of the polyolefin. The term "gel percentage content" as used herein means the ratio of the weight of the sample after extraction to the weight prior to extraction, the extraction being conducted under reflux with trichloroethylene as the solvent within 24 hours in a Soxhlet apparatus with the use of a glass filter of 40–50 $\mu$m. The degree of crosslinking is proportional to the increase in gel percentage content.

In the second process stage, the foamable and crosslinked product is removed from the closed mold after releasing the applied pressure. The foamable and crosslinked product can be readily unmolded or removed from the mold since no foaming has as yet taken place, and the product has not been subjected to being pressed and stuck against the mold wall by a foaming pressure. It is unavoidable during the conductance of the crosslinking reaction in the first process stage that a very slight amount of blowing agent is decomposed, effecting, after unmolding of the foamable and crosslinked product, an expansion to at most twice the original volume. However, such an expansion, which is very slight for a foaming process, is not as yet considered to be a foaming process in accordance with the foaming process of the present invention. The foamable, crosslinked product taken from the mold is left as is; there are no auxiliary parts aiding the unmolding step which would have to be removed. The foamable, crosslinked product is subsequently inserted in between a pair of parallel metal plates, temperature-controlled to the foaming temperature, and heated so that the blowing agent contained in the product is partially decomposed. At this the diatance of the metal plates corresponds to the height of the foamable, crosslinked product so that the metal plates holohedrally touches the product. Subsequently the distance between the parallel metal plates is maintained constantly. During this step, the product expands biaxially in the plane delimited as the interspace between the two metal plates, and a preexpanded intermediate product is obtained having a slab-shaped configuration corresponding to the interspace between the two metal plates.

The foaming temperature required for this process stage depends on the type and mixture ratio of the blowing agents employed and is selected to be between 150° and 190° C., preferably between 160° and 180° C., the foaming of the product occurring gradually on account of the uniform heat transfer from the heated metal plates to the product. The period of treatment of the product in this second process stage, especially the heating and foaming time between the metal plates, is chosen to be between 15 and 45 minutes, depending on the size and composition of the product. The pre-expanded intermediate product obtained in this second process stage is expanded by 6 to 10 times as compared with the original volume, in correspondence with the amount of foamable composition inserted in the closed mold, the decomposition of the blowing agent being maintained in a range from 15 to 60% by weight.

In the third process stage, the pre-expanded intermediate product is removed from the two metal plates and thereafter heated to a temperature corresponding at least to the precedingly employed foaming temperature but preferably lying above this temperature, especially in the range between 160° and 200° C. The treatment period preferably ranges between 20 and 60 minutes; during this time, the blowing agent still remaining in the pre-expanded intermediate product is completely decomposed, and the product expands freely in all directions to form the final, finished foamed. molded part.

In this third process stage, heating and final foaming of the pre-expended intermediate product preferably are carried out in a mold having openings. At this the mold is done into a liquid heating medium, such as for inst. a metal bath containing a Rose's metal or Wood's metal, on oil bath or a salt bath containing one or more salts such as sodium nitrate, potassium nitrate, potassium nitrite and the like. At this the prefoamed intermediate product is heated mainly directly by the heating medium.

It is also possible that the mold at its outer surface is equipped with an electric heating unit or a heating jacket through which a heating medium, for inst. steam, heating oil and the like, are circulating. By heating the mold the inserted, prefoamed intermediate product indirectly is heated via the walls of the mold.

The third process stage is made at a low pressure which approximately corresponds to atmospheric air pressure of 1 bar. At this the mold has a volume making possible a free expanding of the prefoamed intermediate-product up to its final volume. It is also possible to cover the pre-expanded intermediate product with one or several heated metal plates which can be moved up and down. After heating the intermediate product for a predetermined time interval and subsequent cooling, the finished foamed product is obtained, i.e. the molded part. The treatment period, i.e. the heating time, ranges between 10 and 50 minutes. In this way, a completely foamed molded part is produced having a uniform, fine cellular structure with tough cell walls, exhibiting a high degree of expansion of up to about 50 times the original volume, depending on the quantity of blowing agent added. The size of the closed cells ranges between 20 and 150 μm and a degree of crosslinking of about 1–70% is achieved.

The process of this invention makes it possible to produce a closed-cell, fine-cellular and uniform foam material with relatively brief working times and working cycles with high productivity. It is advantageous that, in the first process stage, only a crosslinking reaction takes place while the foaming process is suppressed, making it easy to unmold the product; and that foaming is carried out in two subsequent steps, first while effecting limitation to biaxial expansion and then with three-dimensional expansion. According to this invention, an easy way of performing the process is provided, as well as a high yield, with reduced waste.

Advantageously, the closed-cell foamed molded parts of crosslinked polyolefins obtained by the process of this invention can be utilized as cushioning materials and thermal insulating material and coating material.

The invention will be further described with reference to the following examples:

EXAMPLE 1

A composition containing low-density polyethylene, with a density of 0.920 g/cm$^3$, and a MFR of 1.0, 17 parts by weight of azodicarbonamide per 100 parts by weight of polyethylene, 0.1 part by weight of zinc oxide and 0.6 part by weight of dicumyl peroxide, respectively per 100 parts by weight of polyethylene, was kneaded homogeneously by means of a mixing roll at 100° C. The resultant mixture was introduced into a mold of the size 750×360×28 mm and placed into a press temperature-controlled at a temperature of 150° C. and heated under elevated pressure of 100 bar for 40 minutes to obtain an unexpanded, crosslinked slab. Thereafter, this unexpanded, crosslinked slab was removed from the mold. The gel percentage content of this slab was 42%. Thereafter the slab was inserted for 30 minutes in between a pair of metal plates having a mutual spacing of 28 mm and heated to a temperature of 170° C. During this step, the azodicarbonamide was partially decomposed and the slab expanded biaxially in the interspace defined by the two metal plates. The resultant pre-expanded slab, the so-called pre-expanded intermediate product, was then removed from the metal plates. This intermediate slab was expanded to eight times the original volume; a measurement showed that 25% by weight of the axodicarbonamide had already been decomposed. Then the pre-expanded intermediate slab was inserted in a mold, i.e. in an open mold that was not closed airtight, having a size of 2,080×1,060×95 mm. The mold was equipped with a heating jacket and was heated by steam circulating through the jacket for a period of 30 minutes. The temperature during this step was 175° C. After cooling, the finished foamed slab was removed from the mold; a measurement showed that the axodicarbonamide that had remained after the second process step had been completely decomposed, and the expansion ratio had risen in the meantime to thirty times the original volume. Measurement of the gel percentage content yielded at this point in time 70%.

The completely expanded and crosslinked slab produced in this way showed a unitary, fine, uniform cellular structure of high toughness; the size of the cells was about 50 μm with a thickness of the final product of 90 mm and a foam density of 0.030 g/cm$^3$. The entire slab was usable as foam material, so that up to this point in time of the manufacturing process, no waste material had to be taken into account.

EXAMPLE 2

A composition containing ethylene-vinyl acetate copolymer with a vinyl acetate content of 14% by weight, with a density of 0.937 g/cm3 and a MFR of 1.5, 17 parts by weight of azodicarbonamide, 0.05 part by weight of zinc oxide and 0.8 part by weight of dicumyl peroxide per, respectively, 100 parts by weight of ethylene-vinyl acetate copolymer; was kneaded homogeneously by means of a mixing roll at 90° C. The thus-obtained mixture was filled under elevated pressure into a mold having a size of 750×360×28 mm and maintained at a temperature of 145° C. and heated under elevated pressure of 100 bar for 40 minutes to form an unexpanded, crosslinked slab. Thereafter, the thus-obtained unexpanded, crosslinked slab was removed from the mold. The measured gel percentage content of this slab was 35%. Subsequently, this slab was pre-expanded, as described in Example 1, between two metal plates and subsequently finally foamed in the same way and under the same conditions as described in Example 1. The expansion rate of the resultant pre-expanded intermediate slab was seven times the original volume, 20% of the azodicarbonamide having been decomposed. The finished foamed slab had an expansion rate corresponding to thirty times the original volume, with a gel percentage content of 75%. Also this slab had a unitary, fine, tough, closed cellular structure, the size of the cells being about 50 μm, with a thickness of 90 mm of the finished foamed slab and with a foam density of 0.030 g/cm$^3$. Also in the manufacture of this slab, the net efficiency of the material utilized was 100%.

The invention claimed is:

1. A process for the production of a molded article of closed-cell foam based on crosslinked polyolefins wherein a foamable and crosslinkable composition is prepared by mixing a polyolefin homopolymer and/or copolymer with a blowing agent and a crosslinking agent and the composition is filled into a mold and mold is closed, characterized by the following process steps:

heating the composition in the closed mold under elevated pressure to a temperature effecting crosslinking of the polyolefin by decomposition of the crosslinking agent and progression of the crosslinking reaction, without any substantial decomposition of the blowing agent at said temperature to obtain a foamable, crosslinked product;

removing the foamable, crosslinked product from the closed mold and inserting the product between a pair of metal plates and heating the product to a foaming temperature with partial decomposition of the blowing agent and expansion of the product biaxially within the region defined by the metal plates to obtain pre-expanded intermediate product with a slab-like shape; and heating the pre-expanded intermediate product under low pressure which approximately corresponds to the atmospheric pressure of 1 bar to a temperature corresponding at least to the foaming temperature, in order to decompose the remaining blowing agent, during which heating step the intermediate product expands into all directions to obtain a finished and molded foam article.

2. A process according to claim 1, characterized in that the crosslinking reaction of the foamable, crosslinked composition is maintained to obtain a gel content in the range from 1 to 70%.

3. A process according to claim 1, characterized in that an expansion rate of the pre-expanded intermediate product is obtained in the range from 6 to 10 times the volume of the foamable, crosslinked product 4. A process according to claim 2, characterized in that an expansion rate of the pre-expanded intermediate product is obtained in the range from 6 to 10 times the volume of the foamable, crosslinked product.

5. A process according to claim 1, characterized in that the crosslinking reaction is conducted under a pressure in the range from 20 to 200 kg/cm$^2$ and at a temperature up to maximally 160° C., and foaming in the first phase is carried out at a temperature in the range from 150° to 190° C., and, in the subsequent second phase, at a temperature in the range from 160° to 200° C.

6. A process according to claim 2, characterized in that the crosslinking reaction is conducted under a pressure in the range from 20 to 200 bar and at a temperature up to maximally 160° C., and foaming in the first phase is carried out at a temperature in the range from 150° to 190° C. and, in the subsequent second phase, at a temperature in the range from 160° to 200° C.

7. A process according to claim 3, characterized in that the crosslinking reaction is conducted under a pressure in the range from 20 to 200 bar and at a temperature up to maximally 160° C., and foaming in the first phase is carried out at a temperature in the range from 150° to 190° C., and, in the subsequent second phase, at a temperature in the range from 160° to 200° C.

8. A process according to claim 4, characterized in that the crosslinking reaction is conducted under a pressure in the range from 20 to 200 bar and at a temperature up to maximally 160° C., and foaming in the first phase is carried out at temperature in the range from 150° to 190° C., and, in the subsequent second phase, at a temperature in the range from 160° to 200° C.

9. A process according to claim 2, characterized in that the crosslinking reaction is conducted under a pressure of 20 to 200 bar and at a temperature from 135° to 155° C. and foaming in the first phase between the plates is carried out at a temperature in the range of from 160° to 180° C., and in the subsequent second phase in an open mold under atmospheric pressure at a temperature in the range of from 160° to 200° C.

* * * * *